United States Patent
Kohout et al.

(10) Patent No.: US 9,267,978 B2
(45) Date of Patent: *Feb. 23, 2016

(54) NETWORK EVENT DETECTION (71) Applicant: Landis+Gyr Technologies, LLC, Pequot Lakes, MN (US)

(72) Inventors: Rodney Kohout, Brainerd, MN (US); Stanley E. McHann, Jr., Crosslake, MN (US)

(73) Assignee: Landis+Gyr Technologies, LLC, Pequot Lakes, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 14/172,143

(22) Filed: Feb. 4, 2014

(65) Prior Publication Data
US 2014/0156208 A1 Jun. 5, 2014

Related U.S. Application Data (63) Continuation of application No. 12/688,130, filed on Jan. 15, 2010, now Pat. No. 8,666,355.

(51) Int. Cl.
*G01R 31/02* (2006.01)
*H04W 24/04* (2009.01)

(52) U.S. Cl.
CPC .............. *G01R 31/02* (2013.01); *H04W 24/04* (2013.01)

(58) Field of Classification Search
CPC ............................... G01R 31/02; H04W 24/04
USPC .......... 455/402; 340/533, 538, 538.12, 12.32, 340/13.23, 288
See application file for complete search history.

(56) References Cited

U.S. PATENT DOCUMENTS

| | | |
|---|---|---|
| 5,553,081 A | 9/1996 | Downey et al. |
| 5,581,229 A | 12/1996 | Hunt |
| 6,154,488 A | 11/2000 | Hunt |
| 6,177,884 B1 | 1/2001 | Hunt et al. |
| 6,998,963 B2 | 2/2006 | Flen et al. |
| 7,102,490 B2 | 9/2006 | Flen et al. |
| 7,145,438 B2 | 12/2006 | Flen et al. |
| 7,180,412 B2 | 2/2007 | Bonicatto et al. |
| 7,184,861 B2 | 2/2007 | Petite |
| 7,209,840 B2 | 4/2007 | Petite et al. |
| 7,224,740 B2 | 5/2007 | Hunt |
| 7,236,765 B2 | 6/2007 | Bonicatto et al. |
| 7,346,463 B2 | 3/2008 | Petite et al. |
| 7,432,824 B2 | 10/2008 | Flen et al. |
| 7,443,313 B2 | 10/2008 | Davis et al. |

(Continued)

*Primary Examiner* — Marcos Torres
(74) *Attorney, Agent, or Firm* — Crawford Maunu PLLC

(57) ABSTRACT

Various aspects of the disclosure are directed to methods, systems, and apparatus, including computer programs encoded on a computer storage medium, for identifying network events. In one aspect, a method includes monitoring signal characteristic values for signals transmitted over a communications channel of a power line communications system and determining that a signal level value for the channel is less than a threshold signal level value for the channel. In response to determining that the signal level value for the channel is less than the threshold signal level value for the channel, a signal to noise ratio for the communications channel is computer and it is determined that the signal to noise ratio for the channel exceeds a threshold value. In response to determining that the signal to noise ratio for the communications channel exceeds the threshold value, storing data received over the communications channel is stored as valid data.

18 Claims, 5 Drawing Sheets

(56) References Cited

U.S. PATENT DOCUMENTS

| | | |
|---|---|---|
| 7,468,661 B2 | 12/2008 | Petite et al. |
| 7,609,784 B1 * | 10/2009 | Heistermann ................. 375/329 |
| 7,706,320 B2 | 4/2010 | Davis et al. |
| 7,738,999 B2 | 6/2010 | Petite |
| 7,742,393 B2 | 6/2010 | Bonicatto et al. |
| 7,774,530 B2 | 8/2010 | Haug et al. |
| 7,791,468 B2 | 9/2010 | Bonicatto et al. |
| 7,877,218 B2 | 1/2011 | Bonicatto et al. |
| 7,978,059 B2 | 7/2011 | Petite et al. |
| 8,144,816 B2 | 3/2012 | Bonicatto et al. |
| 8,144,820 B2 | 3/2012 | Bonicatto |
| 8,194,789 B2 | 6/2012 | Wolter et al. |
| 8,238,263 B2 | 8/2012 | Kohout et al. |
| 2001/0050948 A1 | 12/2001 | Ramberg et al. |
| 2004/0179584 A1 | 9/2004 | Bilgic et al. |
| 2005/0227693 A1 * | 10/2005 | Kong et al. .................... 455/436 |
| 2006/0218269 A1 * | 9/2006 | Iwamura ....................... 709/224 |
| 2008/0304595 A1 | 12/2008 | Haug et al. |
| 2009/0270950 A1 | 10/2009 | Kivi et al. |
| 2011/0121952 A1 | 5/2011 | Bonicatto et al. |
| 2011/0176598 A1 | 7/2011 | Kohout et al. |
| 2011/0218686 A1 | 9/2011 | McHann, Jr. et al. |
| 2011/0249678 A1 | 10/2011 | Bonicatto et al. |
| 2012/0057592 A1 | 3/2012 | Zeppetelle et al. |
| 2012/0076212 A1 | 3/2012 | Zeppetelle et al. |
| 2012/0084559 A1 | 4/2012 | Bonicatto |
| 2012/0106664 A1 | 5/2012 | Bonicatto et al. |

* cited by examiner

Fig. 5 ns, the baseline signal characteristics representing normal operating characteristics for the channels; and specifying the threshold signal level for the channel based on a baseline signal level.

NETWORK EVENT DETECTION

BACKGROUND

This specification relates to detecting network events.

Service providers utilize distributed networks to provide services to customers over large geographic areas. For example, communications companies utilize a distributed communications network to provide communications services to customers. Similarly, power companies utilize a network of power lines and meters to provide power to customers throughout a geographic region.

These service providers are dependent on proper operation of their respective networks to deliver services to the customers because operational problems in the network can result in lost revenue for the service provider. For example, the service provider may lose revenue based on an inability to provide service during a network outage. Therefore, when a network outage or other network event that disrupts service occurs, it is in the best interest of the service provider to identify the cause of the problem and correct the problem as soon as possible.

In many distributed networks, service providers first receive an indication that there is a problem with the network based on feedback from customers. For example, customers may call the service provider to report a network outage. Based on the information received from the customer, the service provider can take action to remedy the problem with the network. For example, a service provider may access nodes in the network to retrieve additional information regarding the status of the network and/or dispatch workers to attempt to identify the problem.

While a service provider can remedy network outages and other network problems by accessing nodes in the network and/or dispatching workers, the time and resources required to identify the cause of the outage or problem can result in significant loss of revenue for the service provider. Thus, if a service provider can reduce the time required to identify whether a problem exists in a network, or even prevent the problem before it occurs, the service provider can reduce lost revenue due to network outages and increase customer satisfaction.

SUMMARY

In general, one aspect of the subject matter described in this specification can be embodied in methods that include the actions of monitoring signal characteristic values for signals transmitted over a communications channel of a power line communications system and determining that a signal level value for the channel is less than a threshold signal level value for the channel. In response to determining that the signal level value for the channel is less than the threshold signal level value for the channel, a signal to noise ratio for the communications channel is computed and it is determined that the signal to noise ratio for the channel exceeds a threshold value. In response to determining that the signal to noise ratio for the communications channel exceeds the threshold value, data received over the communications channel is stored as valid data. Other implementations of this aspect include corresponding systems, apparatus, and computer programs, configured to perform the actions of the methods, encoded on computer storage devices.

These and other implementations can each optionally include one or more of the following features. For example, methods can further include the actions computing baseline signal characteristics for each of the communications chan- Computing baseline signal characteristics for each of the communications channels can include computing, for each of the communications channels, a baseline signal level of the channel based on signal level values that have been measured for the channel over a specified time. Monitoring signal characteristic values for signals transmitted over the channel can include monitoring signal characteristic values for signals transmitted over a channel of a power line communications system.

In response to determining that the signal level value for the channel is less than the threshold signal level value and that the signal to noise ratio for the channel is greater than the threshold signal to noise ratio methods can further include the actions determining that a capacitor bank has been activated in the power distribution system; and providing a notification that the capacitor bank has been activated in the power line distribution system.

Monitoring signal characteristic values can include monitoring signal level values and noise floor measures for signals transmitted over the channel. Determining that a signal level value for the channel is less than a threshold signal level value comprises detecting a signal amplitude for signals transmitted over the channel that are at least fifty percent less than a baseline signal level for the channel.

Particular implementations of the subject matter described in this specification can be implemented so as to realize one or more of the following advantages. Signal anomalies resulting from significant network events that may have been identified as outages can be more accurately identified. Activation of capacitor banks in a power distribution system can be distinguished from a power outage based on channel characteristics of communications channels in the system. A notification that a capacitor bank has been activated in the power distribution system can be provided, for example to a power provider that manages the network, a maintenance staff, and/or a customer service staff that receives calls from customers to prevent repair crews from being deployed to investigate whether a power outage has occurred. Event detection can be continuously monitored and network events can be verified. More valid data can be stored by identifying a capacitor bank activation as such rather than identifying the activation as an outage.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

A status subsystem monitors channel characteristics of communications channels in a network and identifies a network event based on the monitored channel characteristics. The status subsystem can distinguish between a power outage and activation of a capacitor bank in a power distribution system based on the channel characteristics. In turn, the status subsystem updates the status of the channel and conditionally stores data received over the channel based on the status.

Figure 1:
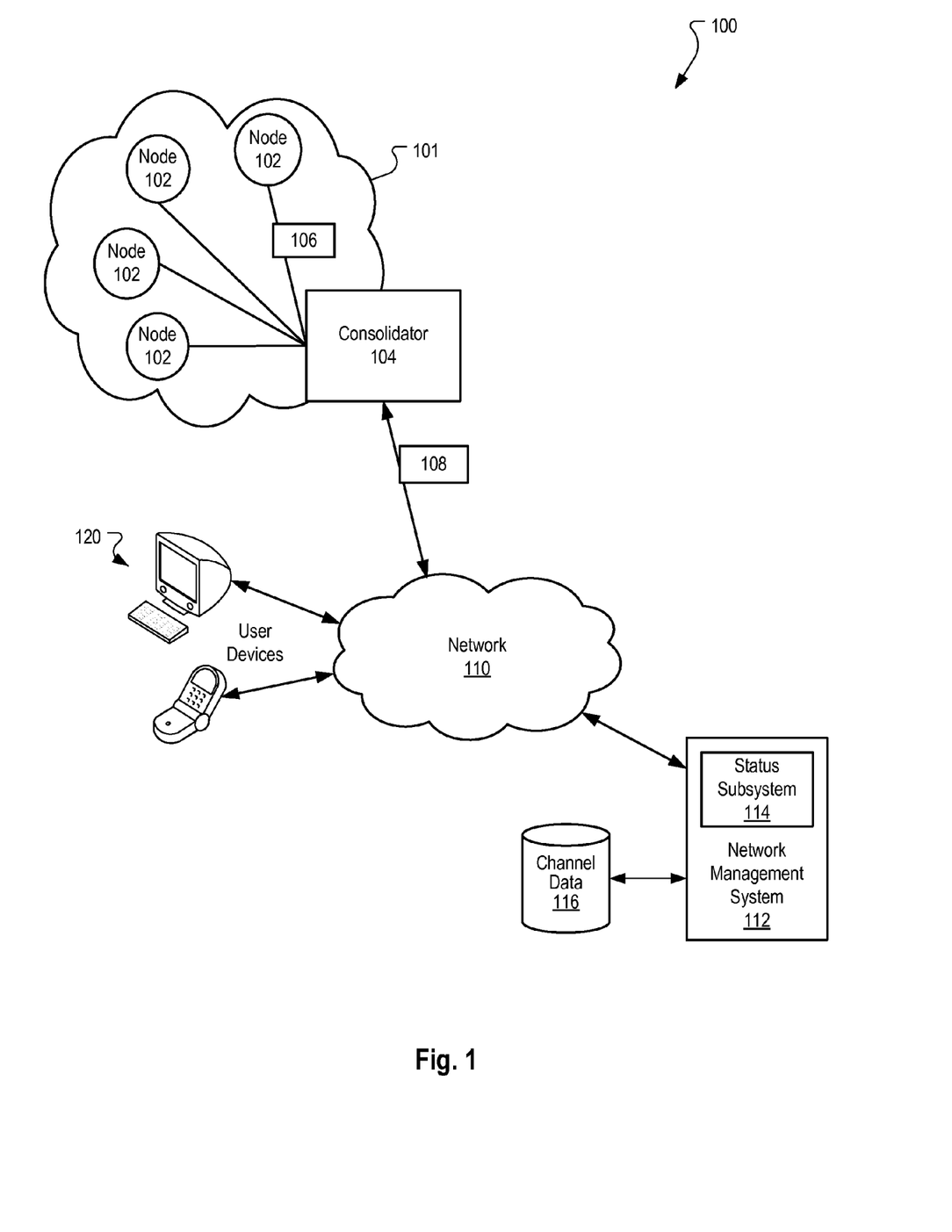
FIG. 1 is a block diagram of an example network environment.

FIG. 1 is a block diagram of an example network environment 100. The network environment 100 includes a service network 101 in which a plurality of nodes 102 are coupled to a consolidator 104. The nodes 102 can be any device capable of transmitting information in the network environment 100. For example, the nodes 102 can be meters in a utility network, computing devices, television set top terminals or telephones that transmit data in the service network. The description that follows refers to the nodes 102 as meters in a power distribution network. However, the description is applicable to other types of nodes 102 in other utility networks or other networks.

The nodes 102 can be implemented to monitor and report various operating characteristics of the service network 101. For example, in a power distribution network, meters can monitor characteristics related to power usage in the network. Example characteristics related to power usage in the network include average or total power consumption, power surges, power drops and load changes among other characteristics.

The nodes 102 report the operating characteristics of the network over communications channels. Communications channels are portions of radio frequency spectrum over which data are transmitted. The frequency spectrum and bandwidth of each communications channel can depend on the communications system in which they are implemented. For example, communications channels for utility meters (e.g., power, gas and/or water meters) can be implemented in power line communication (PLC) systems and wireless communications systems such as cellular communications systems, wireless broadband networks, wireless mesh networks and other wireless communications systems.

Communications channels for each of these different communications systems have distinct operating parameters that are defined, in part, by communications standards and/or environmental considerations. For example, in a PLC system, operating parameters for communications channels are defined so that the communications channels can operate on the same transmission lines on which power is distributed throughout a power grid. The description that follows refers to communications channels of PLC systems for example purposes. However, the description is also applicable to communications channels in other communications systems.

In some implementations, the nodes 102 transmit the operating characteristics of the distributed network 101 over communications channels to a consolidator 104. The consolidator 104 is a processing apparatus that consolidates communications from nodes 102 for transmission though a data network 110. For example, the consolidator 104 can receive data bits or data packets 106 from nodes 102 and generate a consolidated packet 108 that includes data from multiple data packets 106 received from the nodes 102. While consolidated packets 108 are discussed for example purposes, the consolidator 104 can operate as a repeater to retransmit the data packets 106 through the data network 110 instead of creating a consolidated packet 108.

The consolidated packets can be generated such that redundant data in the data packets is removed to increase efficiency. Similarly, a consolidator 104 can re-format data received from the nodes 102 for transmission to a device through a data network 110. For example, when multiple nodes 102 are all reporting the same network event (e.g., a service outage), the consolidator can create a consolidated packet that includes a single instance of network event data identifying the network event and includes data identifying each node that is reporting the event. Thus, each consolidated packet can include data from many different nodes 102 and transmitted over many different communications channels.

A consolidator 104 can be implemented as a node 102, a repeater, a router or any other data processing device that can receive data from nodes 102 and retransmit the data through a network environment 100. In some implementations, a single consolidator 104 can receive data packets 106 from thousands of nodes 102 and transmit the data packets 106 and/or consolidated packets 108 through a data network 110.

The data network 110 can be a wide area network (WAN), local area network (LAN), the Internet, or any other communications network. The data network 110 can be implemented as a wired or wireless network. Wired networks can include any media-constrained networks including, but not limited to, networks implemented using metallic wire conductors, fiber optic materials, or waveguides. Wireless networks include all free-space propagation networks including, but not limited to, networks implemented using radio wave and free-space optical networks. While only one consolidator 104 is shown, the service network 101 can include many different consolidators 104 to couple many thousands of nodes to the data network 110.

In some implementations, the data network 110 couples the consolidator 104 to a network management system 112. The network management system 112 is a system that monitors and/or controls the service network 101. The network management system 112 can control different characteristics of the service network 101 based on data received from nodes 102 that are installed in the service network 101.

For example, in a PLC network, the network management system 112 can receive a consolidated packet 108 that includes data indicating that power usage is significantly higher in a particular portion of a power network than in other portions of the power network. Based on this data, the network management system 112 can allocate additional resources to that particular portion of the network (i.e., load balance) or provide status data specifying that there is increased power usage in the particular portion of the power network.

The network management system 112 can provide the status data to a user device 120 that can be accessed, for example, by the network operator, maintenance personnel and/or customers. For example, status data identifying the detected increased usage described above can be provided to a user device 120 accessible by the network operator, who can, in turn, determine an appropriate action regarding the increased usage. Similarly, if the status data indicates that there is a network outage, the network management system 112 can provide data to user devices 120 accessible by customers to provide information regarding the existence of the outage and potentially provide information estimating a duration of the outage.

Data packets 106 and/or consolidated packets 108 may be transmitted over one of thousands of channels in a PLC system. However, the ability to reliably receive data over the channels in the PLC system can be affected by significant network events that cause signal anomalies on the communications channels. For example, when a power outage occurs in a PLC network, amplitudes of communications signals that are transmitted on channels over which nodes affected by the power outage communicate can drop to substantially zero. Amplitudes of communications signals can be measured in units of voltage or power and are referred to throughout this document as signal levels.

As the signal levels of signals transmitted over affected channels approach zero, data received over the affected channels may be unreliable. Therefore, some network operators will specify that at least a threshold signal level that must be present on a channel for data received over the channel to be logged as valid data. Valid data can be stored, for example, to a data store, such as the channel data store 116.

Each channel in the network can have unique operating characteristics, such that the threshold signal level specified for each channel may differ. For example, a first channel may have a center frequency that corresponds to an RF frequency for which signals through the PLC are significantly attenuated relative to other channels in the system. Thus, the signal level on the first channel may be consistently lower than the signal level of the other channels, even in a normal operating condition.

Similarly, a noise floor for the first channel can vary relative to the noise floors of other channels, such that absolute measures of signal level reduction will have different effects on the reliability of data on each of the channels. For example, data received over a channel having a higher noise floor than other channels can become unreliable from lower signal level reductions than the signal level reductions that render data unreliable on the other channels having lower noise floors. The noise floor of a channel as used throughout this document refers to a measure of the signals from noise sources that are present on the channel.

The differences in channel characteristics for different channels can be a result of operating characteristics of components used to implement the system and/or environmental factors. For example, gain and noise characteristics for a transmitter can vary over its radio frequency operating range such that signals transmitted at one frequency can have different gain and noise characteristics than signals transmitted at another frequency. Similarly, the environment in which the signals are transmitted can affect channel characteristics. For example, other signals being transmitted near the PLC system can interfere with signals being transmitted in the PLC system and degrade the channel characteristics.

The channel characteristics include signal characteristics for signals that are transmitted over the channel. Channel characteristics for each channel can be measured, for example, by receivers that are receiving communications over the channels. For example, the consolidator 104 can measure RF characteristics (e.g., signal level and noise floor) for the channels over which the consolidator receives data. The channel characteristics can be stored, for example, in a data store such as the channel data store 116.

In some implementations, the channel characteristics are measured over a period of time to determine baseline channel characteristics for each channel. For example, the network management system 112 can receive data representing measured RF characteristics of each channel for a specified period of time and compute baseline channel characteristics based on the received data. Baseline channel characteristics are characteristics of the channel when the channel is in a "normal" operating condition. Channels that are operating in a "normal" operating condition are referred to as channels that are in a permanent state.

The baseline channel characteristics can include, for example, a baseline noise floor measure for the channel and a baseline signal level measure. Each baseline characteristic (e.g., signal level and noise floor) can be computed as a function of the corresponding channel characteristic measurements or computed based on statistical analysis of the corresponding channel characteristic measurements.

For example, the baseline signal level for a channel can be an average (or median or some other central tendency) value of the signal level values that have been measured for the channel over the previous day, week, or month. Similarly, a baseline noise floor for a channel can be an average noise floor for the channel computed from the noise floor measurements for the channel over a previous day, week, or month. Other baseline channel characteristics can also be computed, such as a baseline signal to noise ratio and/or a baseline data integrity measure (e.g., baseline bit-error-rate).

Using the baseline channel characteristics a threshold signal level can be specified for each channel. The threshold signal level is a minimum signal level (i.e., minimum signal amplitude) at which data received over the channel is assumed to be valid data. The threshold signal level can be a specified fraction of the baseline signal level, a specified absolute signal level, or another specified measure of signal level relative to the baseline signal level.

The network management system 112 includes a status subsystem 114 that uses the threshold signal levels to determine the status of each channel in the system. For example, the status subsystem 114 can continually or periodically monitor the signal level on each channel and compare it to the threshold signal level for that channel. When the signal level on the channel remains above the threshold signal level, the status subsystem 114 identifies the channel as being in a permanent state, thereby indicating that the data being received over the channel can be stored to the channel data store 116 as valid data. If the signal level on a channel drops below the threshold signal level, the channel is identified as being in a lost state, thereby indicating that the data being received over the channel is not eligible to be stored in the channel data store as valid data.

While the status subsystem 114 can identify a channel as being in a permanent or lost state based on the signal level of a channel, and in turn, an indication of the reliability of data being received on a channel, there are network events other than power outages that can cause the signal level of a channel to drop below the threshold signal level. During some of these network events the data being received over the channel may still be reliable data such that the data can be stored in the channel data store 116 as valid data.

Capacitor bank switching is an example of a network event in which data can still be stored as valid data even though the capacitor bank switching can cause signal levels of affected channels to drop below the threshold signal level. A capacitor bank can be used in a power distribution network to regulate the power factor of the network. For example, when the power factor of a network begins to drop (e.g., based on a load change in the network), a capacitor bank can be activated to increase the power factor.

When the capacitor bank is activated, PLC signals being transmitted through channels affected by the activation can fall below the threshold signal level. Therefore, if the status subsystem is identifying channel states based only on the signal levels of the channel, it may identify the affected channels as being in a lost state. Thus, data received over the channel while the signal level remains less than the threshold signal level will not be stored to the channel data store as valid data and may be lost.

To prevent data loss on channels over which valid data is being received, the status subsystem 114 is configured to determine the state of a channel based on a signal to noise ratio for the channel when the signal level for the channel falls below the threshold signal value. For example, in response to determining that a signal level for a channel has fallen below the threshold signal level, the status subsystem 114 can compute a signal to noise ratio for the channel and compare the computed signal to noise ratio to a threshold signal to noise ratio. If the computed signal to noise ratio meets or exceeds the threshold signal to noise ratio, the status subsystem 114 can identify the channel as being in a permanent state, such that data received over the channel continues to be stored to the channel data store 116. However, if the computed signal to noise ratio is below the threshold signal to noise ratio, the status subsystem 114 can identify the channel as being in a lost state, such that data received over the channel is not stored to the channel data store 116.

In some implementations, the signal to noise ratio for each channel can continuously be computed, so that the status of the channels can be continuously updated based on a comparison of the signal level to the threshold signal level and a comparison of the signal to noise ratio to the threshold signal to noise ratio.

Figure 2:
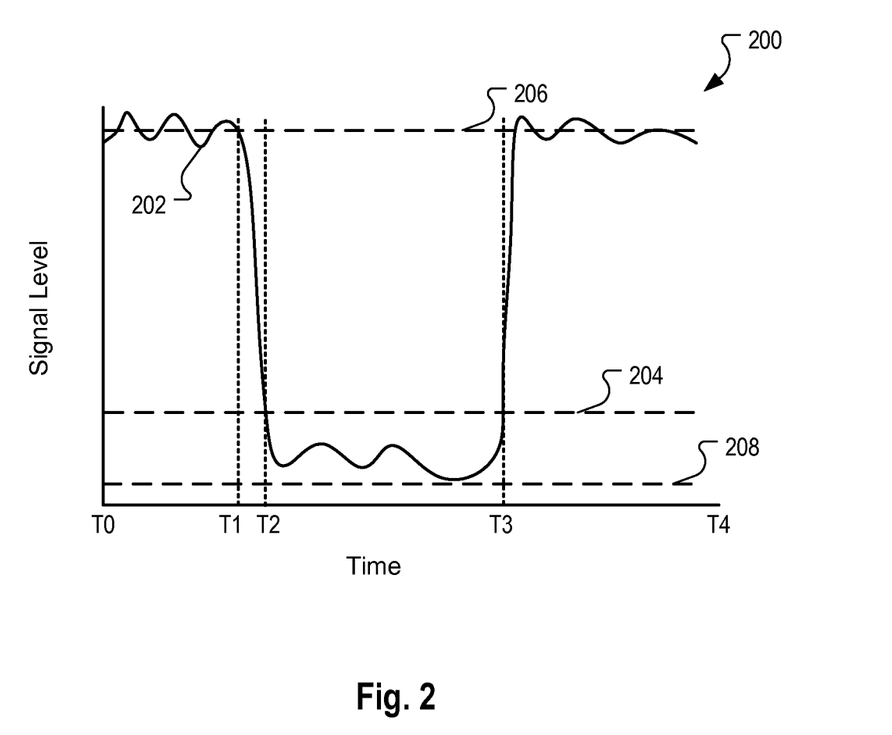
FIG. 2 is a graph of an example signal for a channel in a PLC system affected by activation of a capacitor bank.

FIG. 2 is a graph 200 of an example signal 202 for a channel in a PLC system affected by activation of a capacitor bank at time T1. The signal level of the monitored signal 202 is plotted over time, which is represented by the x-axis of the chart 200. As described above, the baseline level 204 for the channel can be determined and specified based on previous measurements of the signal. The signal 202 has a signal level that is less than the baseline level 206 at time T1, which corresponds to a time at which a capacitor bank is activated. However, the signal level for the signal 202 remains above the threshold signal level until time T2. Therefore, from time T0 to time T2, the status subsystem of FIG. 1 identifies the channel as being in a permanent state based on the signal level and data received over the channel can continue to be stored.

At time T2, the signal level value for the signal 202 falls below the threshold signal level 204 for the channel over which the signal 202 is transmitted. The signal level remains below the threshold signal level 204 until time T3, which corresponds to the capacitor bank being deactivated. After time T3, the signal level value remains above the threshold signal level. Therefore, after time T3, the status subsystem 114 determines that the channel is in a permanent state based on the signal level of the channel.

From time T2 to time T3, corresponding to the time from which the capacitor bank was activated to the time at which the capacitor bank was deactivated, the status subsystem 114 may incorrectly identify the channel as being in a lost state, for example, if the state of the channel is determined based only on the signal level. However, the status subsystem 114 determines the signal to noise ratio for the channel, and if the signal to noise ratio for the channel meets or exceeds the threshold signal to noise ratio, the status subsystem 114 identifies the channel over which the signal 202 is received as being in a permanent state, rather than a lost state. In turn, data that would have been otherwise lost due to an improper determination of the state of the channel is stored as valid data when the state of the channel is verified using the signal to noise ratio.

For example, the minimum signal level at which the threshold signal to noise ratio is exceeded is represented by the line 208. Thus, between times T2 and T3, the channel over which the signal 202 is received is identified as being in a permanent state because the signal level of the signal 202 remains above the line 208. Accordingly, data received over the channel can continue to be logged as valid data.

Figure 3:
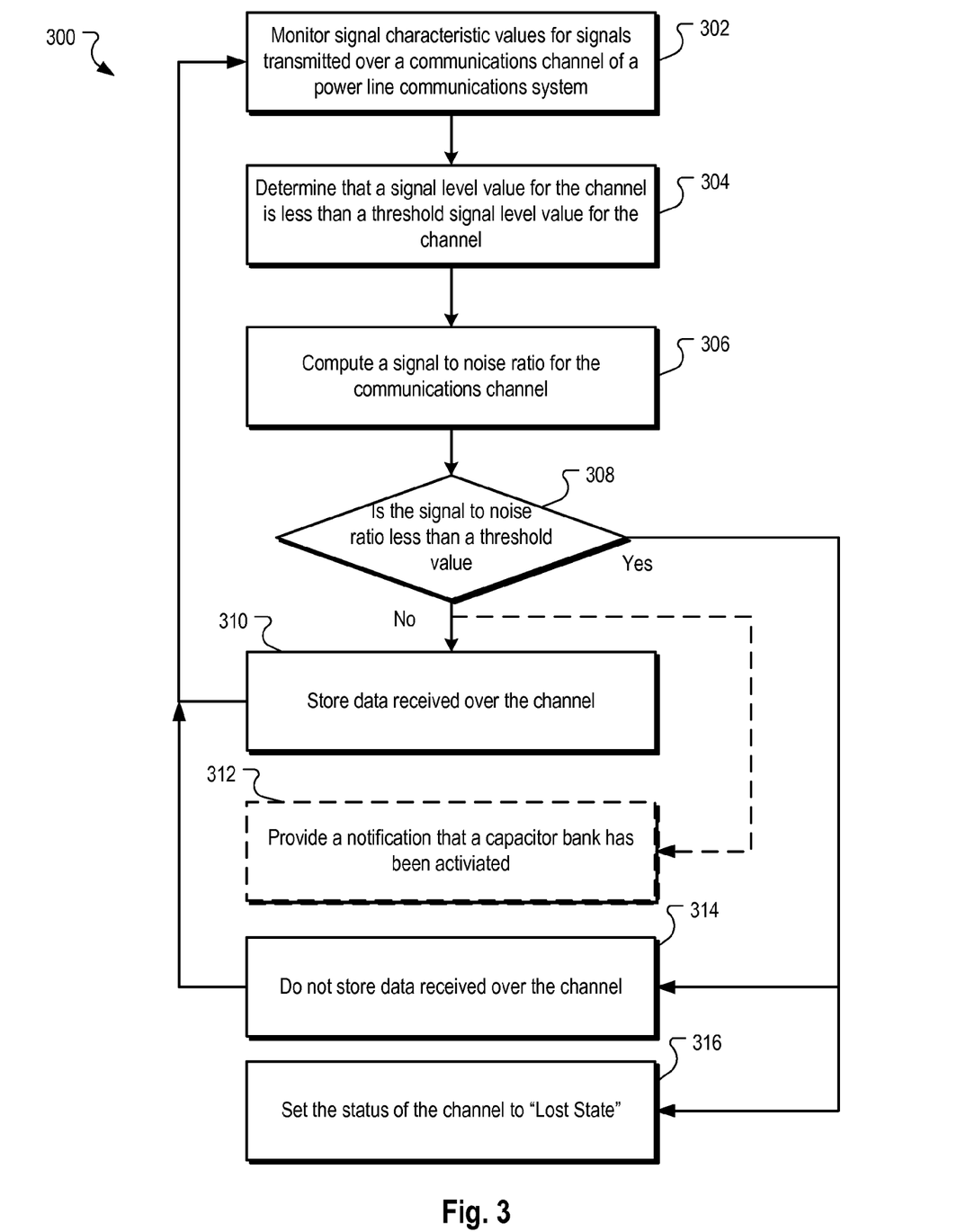
FIG. 3 is a flow chart of an example process for determining whether to store data received over a channel.

FIG. 3 is a flow chart of an example process 300 for determining whether to store data received over a channel. The process 300 is a process by which signal levels of communications channels are monitored and a determination is made that a signal level value for a particular communication channel is less than a threshold signal level value for the channel. In response to the determination, a signal to noise ratio is computed for the channel and compared to a threshold value. When the signal to noise ratio meets or exceeds the threshold value data received over the channel is stored as valid data. When the signal to noise ratio is less than the threshold value, the data is not stored as valid data. A notification that a capacitor bank has been activated can optionally be provided when the signal level is less than the threshold signal level and the signal to noise ratio is greater than the threshold value.

The process 300 can be implemented, for example, by the status subsystem 114 and/or network management system 112 of FIG. 1. In some implementations, the status subsystem 114 includes one or more processors that are configured to perform the actions of the process 300. In other implementations, a computer readable medium can include instructions that when executed by a computer cause the computer to perform actions of the process 300.

Signal characteristic values for communications channels of a power line communications system are monitored (302). In some implementations, the signal characteristic values can be monitored for each channel of the network. The signal characteristic values are values that represent the signal and with which the signal can be characterized. The monitored signal characteristic values can include a signal level value for signals transmitted over the channel and noise floor measures for the channel. The signal characteristic values can be measured, for example, by a receiver device, signal measurement equipment such as an oscilloscope, spectrum analyzer (swept or real-time), or another measurement device that is capable of measuring signal characteristics over time. The measured signal characteristic values can be stored in a data store, such as the channel data store 116 of FIG. 1. The measured signal characteristic values can also be provided to a channel monitoring device, such as the network management system 112 and/or status subsystem 114 of FIG. 1.

A determination is made that a signal level value for a channel is less than a threshold signal level value for the channel (304). The determination can be made, for example, by comparing a currently monitored or received signal level value for the channel to the threshold signal level value.

In some implementations, the threshold signal level value for the channel is specified as a function of a baseline signal level for the channel. For example, the threshold signal level for the channel can be specified as a fraction of the baseline signal level (i.e., one-half or one-third of the baseline signal level) for the channel.

The threshold signal level value can be adjusted based on characteristics of the network in which the channel operates as well as reliability goals. For example, a higher threshold signal level value can be specified when data reliability is more important than the threshold signal level value specified when data reliability is less important.

The baseline signal level value represents the signal level value for the channel under normal operating conditions. The baseline signal level value can be computed, for example, based on signal level values that have been measured for the channel over a specified time period. For example, the baseline signal level value for a channel can be an average or median signal level value for the channel over a past week, month, or year.

A signal to noise ratio is computed for the communications channel (306). The signal to noise ratio for the communications channel can be computed, for example, based on the monitored signal level value and a monitored noise floor measures for the channel.

A determination is made whether the signal to noise ratio for the channel is less than a threshold signal to noise ratio value (308). The determination can be made, for example, by comparing the computed signal to noise ratio to a threshold signal to noise ratio that is stored in a data store or other memory structure.

In some implementations, the threshold signal to noise ratio for the channel can be specified globally for all communications channels in the system. In other implementations, the signal to noise ratio for each channel can be determined on a per-channel basis.

The threshold signal to noise ratio can be selected, for example, based on historical signal to noise ratio data that corresponds to data validity information. The data validity information can be any measure of data validity, such as a data valid bit that is included with each received packet or a packet/bit-error-rate measurement.

The historical signal to noise ratio data can be analyzed to identify a minimum signal to noise ratio at which data received over the communications channels is valid with a threshold likelihood. For example, if a 99% likelihood of data validity is desired, the threshold signal to noise ratio can be selected as the signal to noise ratio at which 99% of received data is identified as valid based on the data validity information.

When the signal to noise ratio for the channel is not less than the threshold value, data received over the channel is stored (310) and signal characteristic values continue to be monitored (302). Additionally, the status of the channel can be maintained as, or changed to, "permanent state," as an indication that data being received over the channel is valid and that the channel is in a normal operating condition. The data received over the channel and the status of the channel can be stored in a data store such as the channel data store 116 of FIG. 1.

When the signal to noise ratio for the channel is greater than the threshold signal to noise ratio and the signal level is less than the signal level threshold, a notification that a capacitor bank has been activated can also optionally be provided (312). For example, a signal can be generated that causes an LED to illuminate, a message to be generated on a display device, an email or text message to be transmitted to a recipient, or any other form of notification to be provided. The notification can be provided, for example to a power provider that manages the network, a maintenance staff, and/or a customer service staff that receives calls from customers. Notification that a capacitor bank has been activated in the network can prevent an operator from deploying repair crews to investigate whether a power outage has occurred.

When the signal to noise ratio for the channel is less than the threshold signal to noise ratio, data received over the channel is not stored (314), and signal characteristic values continue to be monitored (302). Additionally, the status of the channel can be maintained as, or changed to, "lost state," (316) as an indication that data being received over the channel is not valid and that the channel is not in a normal operating state. The status of the channel can be set to lost state in parallel with preventing data from being stored over the channel. The status of the channel can also be set prior to or following preventing data from being stored over the channel. The status of the channel can be stored in a data store such as the channel data store 116 of FIG. 1.

Figure 4:
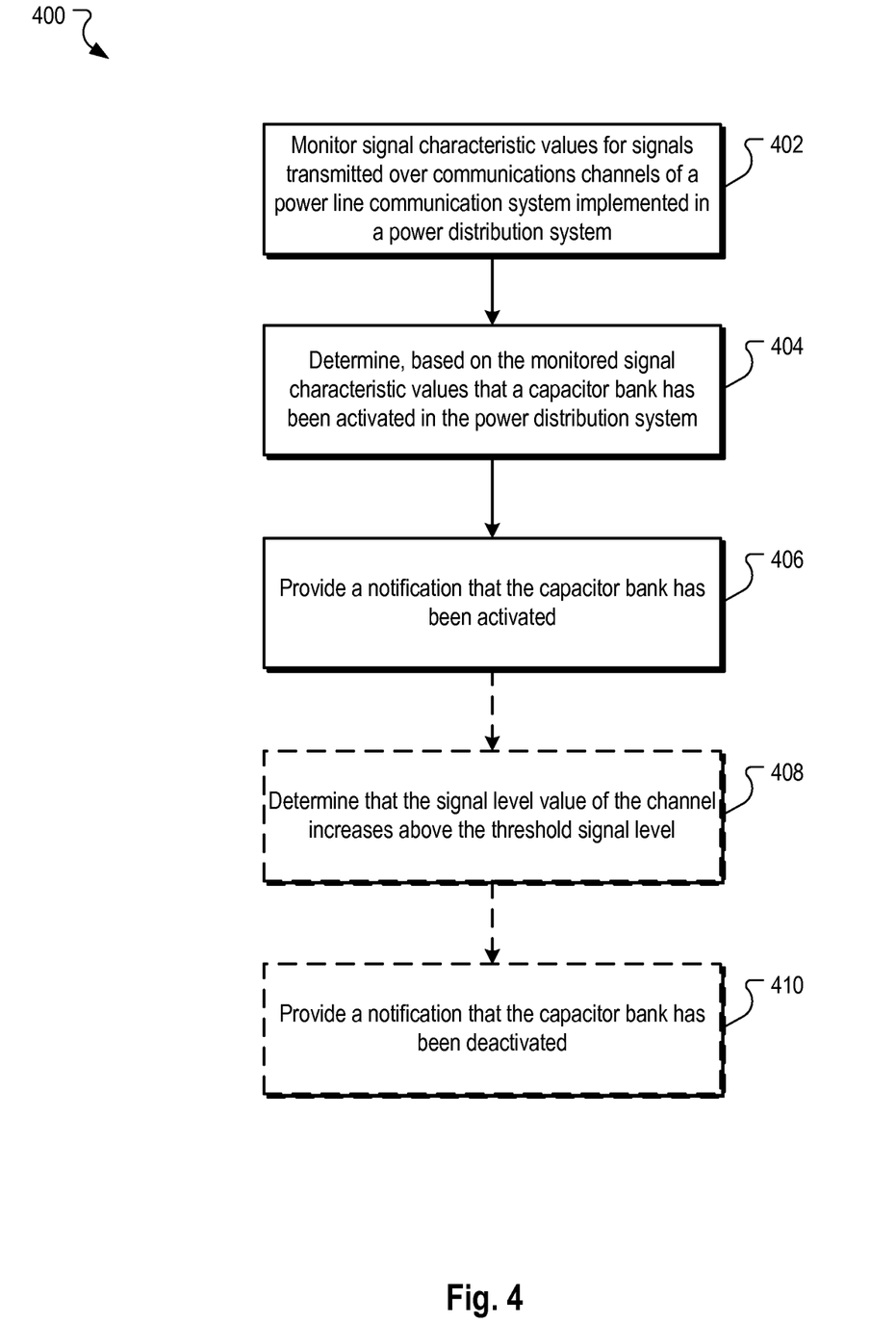
FIG. 4 is block diagram of an example process for identifying activation of a capacitor bank in a power distribution system.

FIG. 4 is block diagram of an example process 400 for identifying activation of a capacitor bank in a power distribution system. The process 400 is a process by which signal characteristic values for signals transmitted over communications channels are monitored. Using the monitored signal characteristic values, a determination is made that a capacitor bank has been activated in a power distribution system and a notification is provided that the capacitor bank has been activated. Optionally, a signal level of a channel can be determined to have increased above the threshold signal level for the channel. In turn, a notification can be provided that the capacitor bank has been deactivated.

The process 400 can be implemented, for example, by the status subsystem 114 and/or network management system 112 of FIG. 1. In some implementations, the status subsystem 114 includes one or more processors that are configured to perform the actions of the process 400. In other implementations, a computer readable medium can include instructions that when executed by a computer cause the computer to perform actions of the process 400.

Signal characteristic values for signals being transmitted over communications channels of a power line communication system are monitored (402). The power line communication system can be implemented in a power distribution system. The signal characteristic values for each channel include a signal level value for the channel and a signal to noise ratio for the channel. The signal to noise ratio can be directly monitored or computed from the signal level value and a noise floor measure for the channel.

Based on the monitored signal characteristic values, a determination is made that a capacitor bank has been activated in the power distribution system (404). In some implementations, the determination is made by determining that the signal level value for a channel is less than a threshold signal level value and the signal to noise ratio for the channel is greater than a threshold signal to noise ratio for the channel.

A notification is provided that the capacitor bank has been activated (406). As described above with reference to FIG. 4, the notification can be provided, for example to a power provider that manages the network, a maintenance staff, and/or a customer service staff that receives calls from customers.

A determination is made that the signal level value of the channel has increased above the threshold signal level (408). In some implementations, the signal level value for the channel with which the capacitor bank activation was identified can continue to be monitored and compared to the threshold signal level value to determine whether the signal level value has increased to a value greater than the threshold signal level value. When the signal level value of the channel increases above the threshold signal level value, it is an indication that the capacitor bank has been deactivated.

A notification that the capacitor bank has been deactivated is provided (410). The notification can be, for example, a message indicating that the capacitor bank has been deactivated and presented on a display device or another manner of indicating that the capacitor bank has been deactivated.

Figure 5:
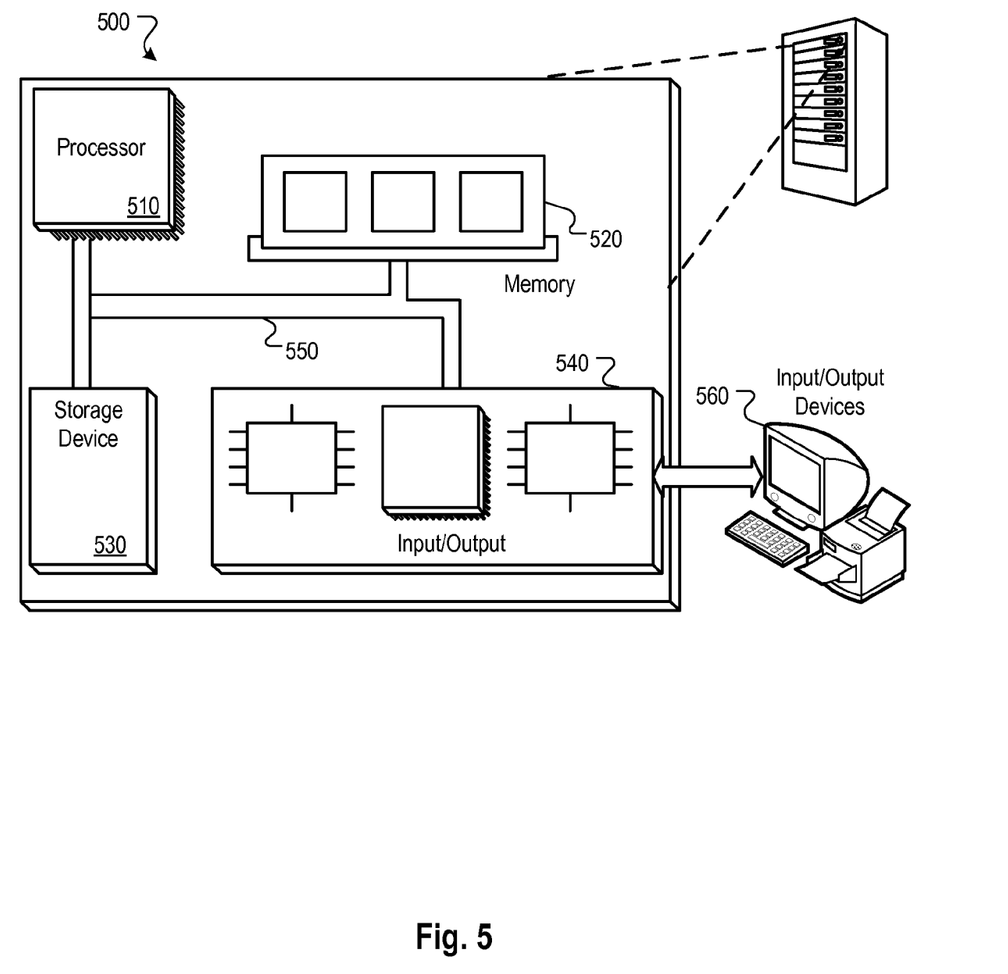
FIG. 5 is a block diagram of an example computer system that can be used to facilitate network event detection.

FIG. 5 is a block diagram of an example computer system 500 that can be used to facilitate network event detection. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, or some other large capacity storage device.

The input/output device 540 provides input/output operations for the system 500. In one implementation, the input/output device 540 can include one or more of a network interface device, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them.

Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD- ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single embodiment. Conversely, various features that are described in the context of a single embodiment can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
for each of a plurality of communications channels of a power line communications system implemented in a power-line distribution system:
monitoring, by logic circuitry, signal characteristic values for a set of signals transmitted over one of the communications channels over a segment of time and determining, based on the monitored signal characteristic values, whether a signal level value for the set of signals is below a threshold level corresponding to a threshold signal level value for the communications channel and whether a noise parameter for the set of signals is less than another threshold level corresponding to a measure of data validity;
in response to the step of determining, storing, by the data processing apparatus, data received over said one of the communications channels as valid data, and providing an update that a circuit in the power-line distribution system has changed; and
in response to the step of determining:
determining that a capacitor bank has been activated in the power-line distribution system, and
providing a notification that the capacitor bank has been activated in the power-line distribution system.

2. The method of claim 1, wherein monitoring signal characteristic values comprises monitoring signal level values and noise floor measures for signals transmitted over said one of the communications channels.

3. The method of claim 1, wherein the step of determining, whether a signal level value for the set of signals is below a threshold level, further comprises detecting a signal amplitude for signals transmitted over the communications channel that are at least fifty percent less than a baseline signal level for the communications channel.

4. The method of claim 1, wherein monitoring signal characteristic values for signals transmitted over said one of the communications channels comprises monitoring signal characteristic values for a signal transmitted over a channel of the power line communications system.

5. The method of claim 1, wherein the determining whether the signal level value for the set of signals is below the threshold level and the noise parameter for the set of signals is less than the other threshold level includes measuring an amplitude and a ratio of noise of the portion of the signal.

6. The method of claim 1, further comprising:
computing baseline signal characteristics for said one of the communications channels, the baseline signal characteristics representing normal operating characteristics for the communications channel; and specifying the threshold signal level value for the said one of the communications channels based on a baseline signal level.

7. The method of claim 6, wherein computing baseline signal characteristics for said one of the communications channels comprises computing, for each communications channel, the baseline signal level of the communications channel based on signal level values that have been measured for the communications channel over a specified time.

8. A non-transitory tangible computer storage medium encoded with a computer program, the program comprising instructions that when executed by a data processing apparatus causes the data processing apparatus to perform operations comprising:

for each of a plurality of communications channels of a power line communications system implemented in a power-line distribution system:

monitoring, by the data processing apparatus, signal characteristic values for a set of signals transmitted over a communications channel over a segment of time;

determining, by the data processing apparatus and based on the monitored signal characteristic values, that a signal level value for the set of signals is less than a threshold signal level value for the communications channel;

in response to determining that the signal level value for the set of signals transmitted over the communications channel is less than the threshold signal level value for the communications channel:

computing, by the data processing apparatus, a signal to noise ratio for the set of signals transmitted over the communications channel;

determining, by the data processing apparatus, whether the signal to noise ratio for the set of signals transmitted over the communications channel is less than a threshold value corresponding to a measure of data validity;

in response to determining that the signal to noise ratio for the set of signals transmitted over the communications channel is less than the threshold value corresponding to the measure of data validity, preventing, by the data processing apparatus, storage of data received over the communications channel as valid data; and in response to determining that the signal to noise ratio for the set of signals transmitted over the communications channel is not less than the threshold value corresponding to the measure of data validity, storing, by the data processing apparatus, data received over the communications channel as valid data.

9. A system, comprising:

a data store storing channel characteristics for a plurality of communications channels of a power line communications system, the channel characteristics including signal level measurements and noise floor measurements for the plurality of communications channels over one or more specified time periods; and a status subsystem coupled to the data store, the status subsystem including one or more processors configured and arranged to determine whether to store data received over each channel of the plurality of communications channels of the power line communications system, the determination for each channel being based on:

a comparison of a signal level value for a set of signals, the set of signals received over the channel over a segment of time within the one or more specified time periods, to a threshold level corresponding to a threshold signal level value for the channel; and in response to the signal level value for the set of signals being less than the threshold level corresponding to the threshold signal level value for the channel, a comparison of a signal to noise ratio for the set of signals, received over the channel over the segment of time, to another threshold level corresponding to a measure of data validity, wherein the status subsystem is configured and arranged to monitor a signal level value for each channel and determine that the monitored signal level value for the channel is less than the threshold signal level value for the channel and to determine that the signal to noise ratio for the channel is less than a threshold signal to noise ratio and prevent data received over the channel from being stored as valid data.

10. The system of claim 9, wherein the set of signals corresponds to the data that is determined to be stored.

11. The system of claim 9, wherein the signal value level and the noise parameter include different parameters of the set of signals transmitted over the segment of time.

12. The system of claim 9, wherein the status subsystem is configured and arranged to compute a baseline signal level for each channel and specify the threshold signal level value for each channel based on the baseline signal level for the channel.

13. The system of claim 12, wherein the status subsystem is configured and arranged to determine that the signal to noise ratio for the channel is greater than the threshold signal to noise ratio and cause data received over the channel to be stored as valid data.

14. The system of claim 12, wherein the status subsystem is configured and arranged to specify the threshold signal level value for the channel based on signal level values for the channel that have been measured over a specified time.

15. A system, comprising:

a data store storing channel characteristics for a plurality of communications channels of a power line communications system, the channel characteristics including signal level measurements and noise floor measurements for the plurality of communications channels over one or more specified time periods; and a status subsystem coupled to the data store, the status subsystem including one or more processors configured and arranged to determine whether to store data received over each channel of the plurality of communications channels of the power line communications system, the determination for each channel being based on:

a comparison of a signal level value for a set of signals, the set of signals received over the channel over a segment of time within the one or more specified time periods, to a threshold level corresponding to a threshold signal level value for the channel; and in response to the signal level value for the set of signals being less than the threshold level corresponding to the threshold signal level value for the channel, a comparison of a signal to noise ratio for the set of signals, received over the channel over the segment of time, to another threshold level corresponding to a measure of data validity, wherein the status subsystem is configured and arranged to compute a baseline signal level for each channel and specify the threshold signal level value for each channel based on the baseline signal level for the channel, to monitor the signal level value for each channel and determine that the monitored signal level value for the channel is less than the threshold signal level value for the channel, to determine that the signal to noise ratio for the channel is greater than a threshold signal to noise ratio and cause data received over the channel to be stored as valid data and to generate a notification that a capacitor bank has been activated in response to a determination that the signal level for the channel is below the threshold signal level for the channel and the determination that the signal to noise ratio for the channel is greater than the threshold signal to noise ratio for the channel.

16. The system of claim 15, wherein the status subsystem is configured and arranged to determine that the signal to noise ratio for the channel is less than the threshold signal to noise ratio and prevent data received over the channel from being stored as valid data.

17. A method performed by a data processing apparatus, the method comprising:
for each of a plurality of communications channels of a power line communications system implemented in a power-line distribution system:
monitoring, by logic circuitry, signal characteristic values for a set of signals transmitted over one of the communications channels over a segment of time and determining, based on the monitored signal characteristic values, whether a signal level value for the set of signals is below a threshold level corresponding to a threshold signal level value for the channel and whether a noise parameter for the set of signals is less than another threshold level corresponding to a measure of data validity;
in response to the step of determining, storing, by the data processing apparatus, data received over said one of the communications channels as valid data, and providing an update that a circuit in the power-line distribution system has changed;
determining a status of said one of the communication channels, wherein the status of the communication channel includes:
a permanent status in response to at least one of:
determining the signal level value for the set of signals is not less than the threshold level corresponding to the threshold signal level value for the channel; and
determining the signal level value for the set of signals is less than the threshold level corresponding to the threshold signal level value for the channel and the noise parameter for the set of signals is not less than the other threshold level corresponding to the measure of data validity; and
a lost status in response to determining the signal level value for the set of signals is less than the threshold level corresponding to the threshold signal level value for the channel and the noise parameter for the set of signals is less than the other threshold level corresponding to the measure of data validity.

18. The method of claim 17, further including:
storing the data corresponding to the set of signals in response to said one of the communication channels being in the permanent status; and
not storing the data corresponding to the set of signals in response to said one of the communication channels being in the lost status.

* * * * *